United States Patent [19]
Alameh et al.

[11] Patent Number: 5,889,737
[45] Date of Patent: Mar. 30, 1999

[54] WRIST CARRIED ELECTRONIC DEVICE

[75] Inventors: Rachid M. Alameh, Schaumburg, Ill.; Francis P. Malaspina, Gainesville, Ga.; Michael P. Metroka, Algonquin, Ill.

[73] Assignee: Motorola, Inc., Schaumburg, Ill.

[21] Appl. No.: 739,403

[22] Filed: Oct. 31, 1996

Related U.S. Application Data

[63] Continuation-in-part of Ser. No. 498,447, Jul. 5, 1995, abandoned.

[51] Int. Cl.$^6$ ........................................................... G04B 1/00
[52] U.S. Cl. .................................................................. 368/204
[58] Field of Search ................................... 368/203–204, 368/281; 228/167–179

[56] References Cited

U.S. PATENT DOCUMENTS

| | | |
|---|---|---|
| 3,032,651 | 6/1962 | Gisiger-Stahli et al. . |
| 3,971,206 | 7/1976 | Martino . |
| 3,973,706 | 8/1976 | Boyce et al. . |
| 4,194,355 | 3/1980 | Nishida . |
| 4,334,315 | 6/1982 | Ono et al. . |
| 4,427,303 | 1/1984 | Matthias . |
| 4,754,285 | 6/1988 | Robitaille . |
| 4,821,532 | 4/1989 | Jaques et al. . |
| 4,847,818 | 7/1989 | Olsen . |
| 4,972,394 | 11/1990 | DiMarco . |
| 5,008,864 | 4/1991 | Yoshitake . |
| 5,235,560 | 8/1993 | Seager . |
| 5,235,561 | 8/1993 | Seager . |
| 5,239,521 | 8/1993 | Blonder . |
| 5,265,265 | 11/1993 | Hama et al. . |
| 5,615,179 | 3/1997 | Yamamoto et al. ..................... 368/281 |

*Primary Examiner*—Bernard Roskoski
*Attorney, Agent, or Firm*—Kevin D. Kaschke

[57] ABSTRACT

A portable electronic device (10) comprises a radio circuit (150) contained in a housing (152) having positive (156) and negative (158) contacts electrically coupled to the radio circuit (150). A substantially flat, elongated, flexible battery cell, forming a compliant energy storage device (32), provides a single, continuous wrist band (30) and has positive (160) and negative (162) terminals. A latch mechanism (176) releasably secures the housing (152) to the wrist band (30) between opposite ends (172, 174) of the wrist band (30), and permits the contacts (156, 158) of the housing (152) to align with and abut the respective terminals (160, 162) of the wrist band (30) while the wrist band (30) is worn on the user's wrist. Multiple housings (152, 180) may be stacked to add electrical functions. The contacts (156, 158) of the housing (152) and the terminals (160, 162) of the compliant energy storage device (32) are positioned to be substantially protected from contamination by the external environment and from contact with the user's wrist when the housing (152) is carried on the wrist band (30) and while the wrist band (30) is worn on the user's wrist.

4 Claims, 6 Drawing Sheets

WRIST CARRIED ELECTRONIC DEVICE

CROSS-REFERENCE TO RELATED APPLICATIONS

The present application is a continuation in part of patent application Ser. No. 08/498,447, filed on Jul. 5, 1995 and assigned to the assignee of the present invention now abandoned.

FIELD OF THE INVENTION

The present invention relates generally to portable electronic devices, and more particularly to a portable electronic device carried on a user's wrist by a wrist band and powered by an electronic storage device in the wrist band.

BACKGROUND OF THE INVENTION

Consumer markets continue to request smaller portable electronic devices which have greater functional features. Examples of such devices include two-way and broadcast radio receivers (i.e., Walkman®), compact disc players, cellular telephones, and computer devices to name but a few. As portable electronic devices have become smaller, a variety of carrying means have been developed. These carrying means have included belt-mounted carrying cases which have gained particular acceptance in applications such as portable radios and compact disc players. However, as devices have become smaller and smaller, carrying means such as belt clips have become less and less desirable. Further, as such devices have become smaller, they have become more compatible with wearing in more convenient places, such as, for example, on the wrist. An example of this type of device, might be, for example, a one-way call receiver, such as a portable paging device. Pagers which are worn on the wrist have long been incorporated into wristwatch type devices. In these devices, the pager and the watch are an integral unit. The battery powering the pager and the watch is incorporated into the back of the integral unit. Unfortunately, this type of device configuration with the battery in the back of the device would not work for other high power consumption personal communication devices, such as cellular phones. To incorporate the battery into this type of integral unit would expand the size of the phone itself making it bulky and unattractive. Further, the battery would use too much precious space which could be more efficiently used for customer feature electronics. Finally, placement of the battery in the integral unit itself would make battery replacement, even if it is a rechargeable battery, require disassembly of the device, thereby occasioning damage and inconvenience to the user.

U.S. patent application Ser. No. discloses a portable electronic device carried on the user's wrist by a wrist band and powered by a power supply in the wrist band. The portable electronic device includes two sets of contacts exposed on the exterior of each side of the portable electronic device and coupled to electronic circuitry inside the portable electronic device. The wrist band includes two wrist band portions wherein each wrist band portion has one set of contacts. The sets of contacts on each wrist band portion are exposed to the exterior of the wrist band and coupled to an energy storage device inside each wrist band portion. The two sets of contacts on the portable electronic device are electrically coupled to the set of contacts on each wrist band portion to transfer power from the energy storage devices to the portable electronic device. One disadvantage of the above-mentioned application is that the contacts on the portable electronic device and the contacts on the wrist band are exposed. Such exposure subjects the contacts to contamination from the environment and contact with the user. Another disadvantage of the above-mentioned application is that the linear space consumed by the portable electronic device limits linear space in the wrist band portions for the energy storage devices. Limitations on the energy storage devices reduces the amount of time that the portable electronic device can operate before the energy storage devices need recharging. Still another disadvantage of the above-mentioned application is that four contacts are provided on the portable electronic device for electrical coupling to four contacts provided on the wrist band portions. Multiple contacts increases piece part count and consumes valuable limited space on such a miniature portable electronic device.

Accordingly, there is a need for a portable electronic device carried on a user's wrist by a wrist band and powered by a electronic storage device in the wrist band, wherein the wrist band has contacts protected from environmental contamination and contact with the user's wrist, has increased space for additional energy storage capacity, and has a reduced number of contacts.

DETAILED DESCRIPTION OF THE PREFERRED EMBODIMENTS

Figure 1:
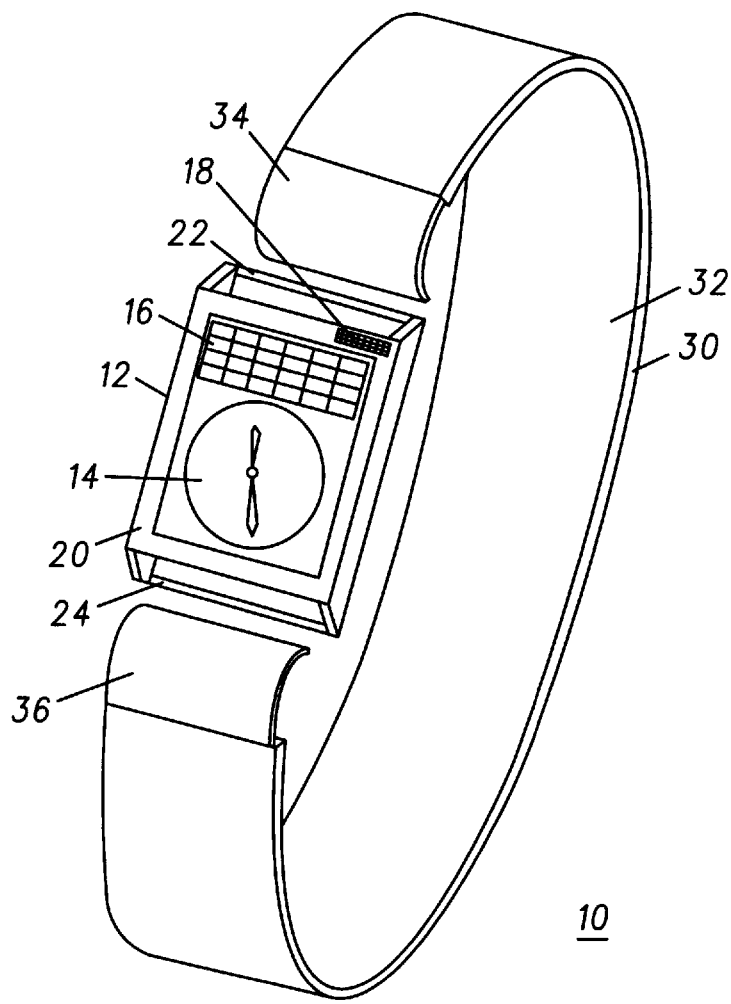
FIG. 1 is a perspective view of a portable electronic device having an attachment belt or band, said band having an energy storage device integrally formed therein.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, there is illustrated therein an perspective view of an electronic device having a belt or band for attaching the device to another member. The device 10 includes an electronic unit 12 intended to be worn, for example, on a user's wrist. The device 10 may be a watch or may be adapted for personal communication or personal computing. Accordingly, the device 10 includes a conventional watch face 14 as well as, for example, speaker and microphone means 16 and 18 respectively. Alternatively, if the device incorporates a pager, there might be a small liquid crystal display and an audio annunciator. The electronics necessary for making a watch, or for that matter, a portable cellular phone, two-way radio or selective radio receiver, such as a pager, are well known in the art, and may be incorporated into the electronic unit 12.

The communication device and watch are incorporated into a housing which includes at least first and second attachment clips 22 and 24. The attachment clips 22 and 24 may be simple pins or dowels as are commonly found in wristwatch applications for mechanically connecting a watchband to the watch. The clips 22 and 24 are further adapted to act as battery contacts, electronically connecting the device 10 to an electrochemical charge storage device such as a battery. While the battery to which clips 22 and 24 may be connected and may be a conventional, prismatic or cylindrical battery cell, it is contemplated that such a battery will instead be fabricated of a conformal, flexible material which is further adapted to function as the wrist band 30 or otherwise as a belt for attaching the device 10 to a user. Flexible, conformed energy storage devices, and methods for making same, are fully disclosed in commonly assigned, co-pending U.S. patent application Ser. No. 08/494,463, filed on Jun. 23, 1996 in the names of Louie, et al and entitled Packaging For An Electrochemical Device And Device Using Same, the disclosure of which in incorporated herein by reference.

The wrist band 30 includes a battery portion 32 and first and second terminals 34 and 36. The terminals 34 and 36 are adapted to function as contacts for attaching to attachment clips 22 and 24 respectively. Accordingly, terminals 34 and 36 may be the positive and negative terminals of the battery portion 32 and are hence electrically coupled to the device 10 via contacts 22 and 24. The terminals are also adapted to electrically and mechanically couple the battery to a charging device.

Figure 2:
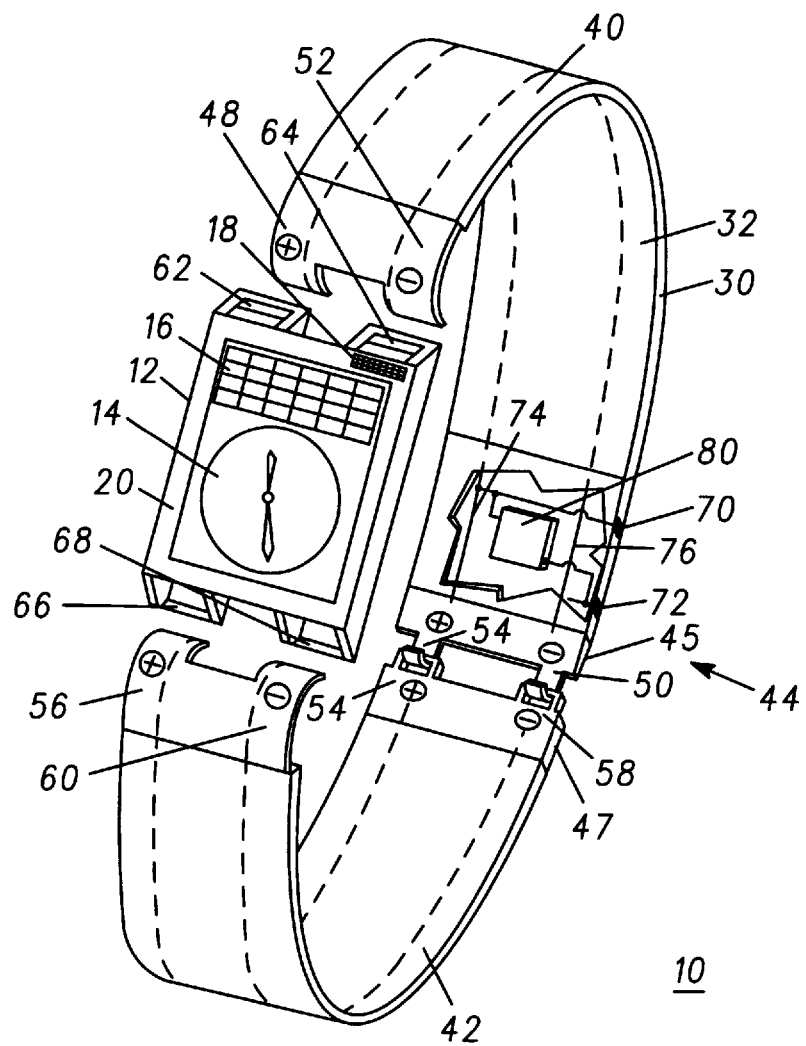
FIG. 2 is a perspective view of a first alternative embodiment of a portable electronic device.

Referring now to FIG. 2, there is illustrated therein an alternative embodiment of a portable electronic device. In this embodiment, the wrist band 30 includes first and second battery portions 40, 42 which may be coupled together by a buckle 44, having first and second connection members 45, 47. In this embodiment, both portions are discrete battery cells having positive and negative terminals at each end thereof. Specifically, portion 40 has positive terminals 46, 48, wherein terminal 46 is located in buckle 44, and terminal 48 is located at the distal end of portion 40. Portion 40 further includes negative terminals 50, 52, wherein terminal 50 is locate din the buckle, and terminal 52 is located at the distal end. Portion 42 likewise includes positive terminals 54, 56, and negative terminals 58, 60 arranged as in portion 40.

In the embodiment of FIG. 2, the device 10 requires two sets of contacts at each side thereof for mechanically and electrically coupling the device to the battery portion 40, 42. Accordingly, positive terminal 48 and negative terminal 52 of portion 40 electrically and mechanically coupled to terminals 62 and 64 of device 10. Similarly, positive terminal 56 and negative terminal 60 of portion 42 electrically and mechanically couple to terminals 66, 68 of device 10.

The battery portions 40, 42 are electrically and mechanically coupled by connection members 45, 47 so that positive terminal 46 connects to positive 54, and negative terminal 50 connects to negative terminal 58. While the electrical and mechanical connection illustrated herein are made via "key/key-hole" connectors, it will be apparent to one of ordinary skill in the art that other connection schemes may also work at least as well as that illustrated herein.

The buckle 44 may further be adapted to function as a charger interface for battery portions 40, 42. Buckle 44 may therefore include charger contacts 70, 72, wherein charger contact 70 is electrically interconnected with positive terminals 46, 48, 54, 46 via line 74, and charger contact 72 is electrically interconnected to negative contacts 50, 52, 58, 60 via line 76. The buckle 44 may also include charger electronics 80 for monitoring the charging of the battery portions. Numerous different charge monitoring circuits are known in the art, and may be employed advantageously herein. The charger electronics 80 may further be adapted to monitor various cell characteristics during charging, such as temperature, pressure, voltage, or current, to name but a few. The charge electronics 80 may also include a memory device in which is stored the charging algorithm for charging the battery portions.

Figure 3:
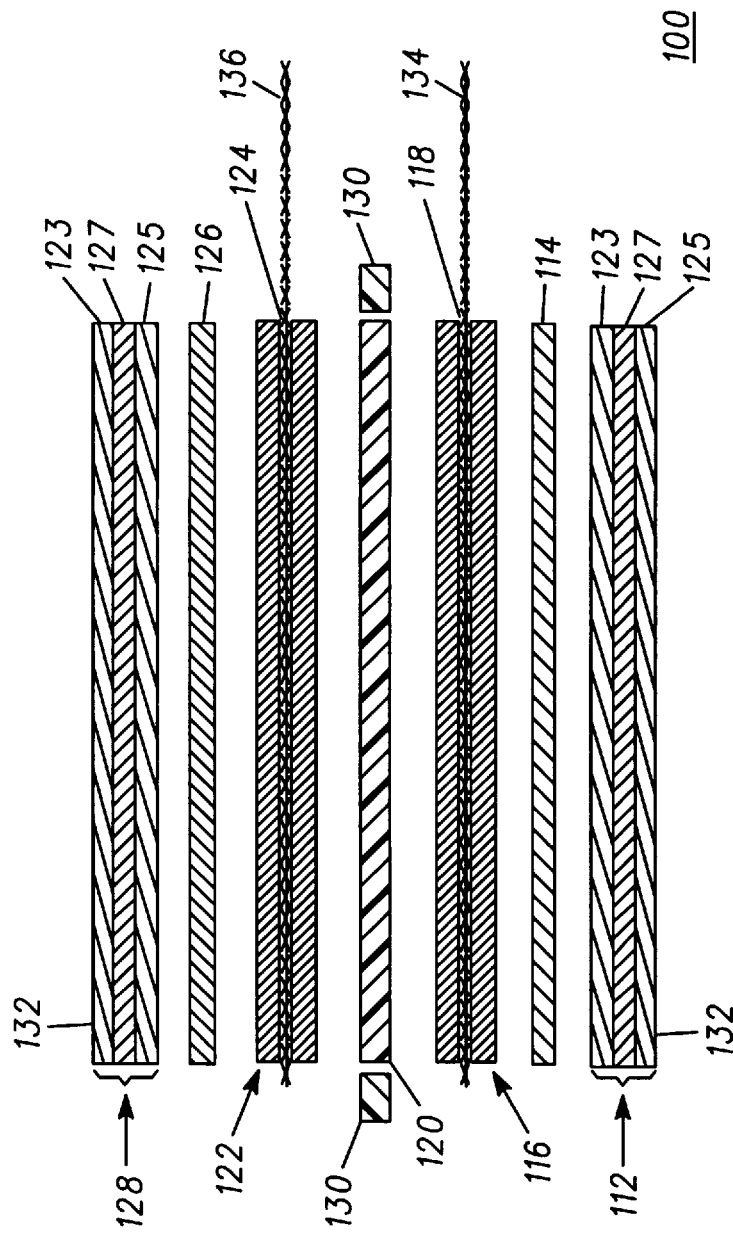
FIG. 3 is exploded side view of an energy storage device in accordance with the instant invention.

Referring now to FIG. 3 there is illustrated therein an exploded side view of an electrochemical charge storage device 100 adapted for use as the wrist band 30 in accordance with the instant invention. The electrochemical charge storage device 100 comprises a first polymeric packaging film 112, first metal foil 114, first electrode 116, first current collector 118, electrolyte 120, second electrode 122, second current collector 124, second metal foil 126, second polymeric film packaging 128 and polymer sealing strip 130. The first polymeric packaging film 112 and second polymeric packaging film 128 are fabricated of a polymeric material having a water vapor permeability of less than 1.3 g/m$^2$ day where day for water vapor transmission measurement is defined as 1 atmosphere pressure, one mm thick film, and 95% relative humidity. The material should also have an oxygen gas permeability of less than 46.5 ml/m$^2$ day where day for oxygen vapor transmission measurement is defined as 1 atmosphere pressure, one mm thick film, and 75% relative humidity. Since it is difficult to find a single polymer having these properties, the films 112 and 128 are each multi-layered structures. These multi-layered structures are formed by co-extruding two or more polymers to make the packaging film having a thickness less than about 5 mm, and preferably about 2 mm. It will occur to one of ordinary skill in the art to place multiple layers of such films atop one another in order to build a thicker device appropriate for a ruggedized wristband application.

Co-extrusion is a one-step process and is well known in the art as a process for forming sheets of polymeric material. Preferably the multi-layered structures from which films 112 and 128 are fabricated as a three-layered structure in which the first and third layers 123 and 125 are fabricated of polyethylene or polypropylene which can each be co-extruded of any of the following materials: poly (vinylidene)chloride, polyester, fluorocarbon resin, polyvinyl chloride, and poly(vinylidene)chloride-methacrylate. The first and third layers 123, 125 encapsulate or sandwich a second layer 127 fabricated of, for example, a layer of poly(vinylidene) chloride, to form a sheet of packaging film. The film is then cut into the required shape for the wrist band application.

The films define a package perimeter by the outer edges 32 of the films 112 and 128. Further, the films are of the same size and shape, and thus correspond to each other when stacked vertically one atop the other. Optionally disposed on top of first polymeric packaging film 112 is first metal foil 114.

The first metal foil and second metal foil 126 which is disposed atop the second polymeric packaging film 128 are provided in those circumstances in which additional oxygen and vapor barrier characteristics are necessary in addition to those provided by the polymeric packaging film. Thus, such films may be used to make the battery/wristband waterproof at elevated pressures. When used, the first and second metal foils 114 and 126 are generally located centrally on the polymeric packaging film, and entirely within the perimeter defined by the outer edges 132 thereof. The foil thickness is generally in the range of 5–25 microns and preferably about 10 microns. It will however occur to those of ordinary skill in the art that thicknesses outside this range may be used without a loss of performance.

An additional function of the foil when used, is to separate the electrodes 116, 122 from the packaging films 112, 128. This may be necessary in certain circumstances in which compatibility between the packaging film and the electrode materials is not ideal. Hence, the metal foil barriers are preferably formed of materials which are compatible with the electrode and packaging film. In this regard, the metal foil barriers are preferably formed of metal selected from the group of aluminum, copper, silver, gold, nickel, stainless steel, and combinations thereof.

The first electrode 116 is disposed on either the first metal foil or the first layer of polymeric packaging material within the perimeters defined thereby. The first electrode is sized and shaped such that it is only slightly smaller than the first metal foil, or the first layer of polymeric packaging material. The first current collector 118 is attached to the first electrode 116, and has a portion extending thereon from beyond the package perimeter defined by the first polymeric packaging film. The current collector thereby defines a first tab 134. The first tab 134 is either attached to terminal 34 of FIG. 1, or is adapted to function as terminal 34 of FIG. 1 for electrically coupling the charge storage device with device 10 of FIG. 1.

Disposed over the first electrode 116 is an electrolyte 120 which is either an aqueous electrolyte or a polymer gel electrolyte material. Alternatively, the electrolyte may be solid state electrolyte. Electrolytes selected for use in the instant application are known in the art and may be readily practiced by those of ordinary skill. The electrolyte is disposed so that no portion of the first electrode is visible, i.e., the first electrode is completely covered by the electrolyte with the first tab extending outwardly from underneath the electrolyte.

The second electrode 122 is disposed on the electrolyte 120, is the same size and shape as first electrode, and is positioned such that it corresponds with first electrode 116. First and second electrodes are made, of different electrochemically active materials, so as to provide a voltage potential. Appropriate pairs of such materials are known in the art. A second current collector 124 is attached to the second electrode and has a portion extending beyond the package perimeter, thereby forming a second tab 136. The second tab, like first tab 134, is adapted to function as the terminal for attaching the battery 32 of FIG. 1, to the attachment clip 34 of FIG. 1. Hence, positive and negative terminals 34, 36, of FIG. 1 are provided by the tabs 134, 136 of FIG. 3. Alternatively, tabs 134, 136 of FIG. 3 extend from both ends of the package perimeter, and are off-set so as to provide lines 74 and 76 in the embodiment of FIG. 2.

To assemble the electrochemical charge storage device of FIG. 3, the first and second metal foils, first and second electrodes, with attached first and second current collectors and the electrolyte are arranged in a stacked configuration.

Figure 4:
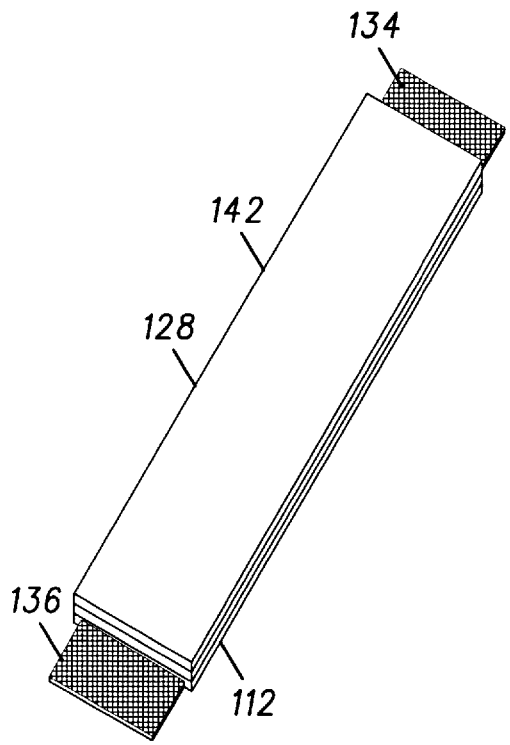
FIG. 4 is a perspective view of an energy storage device in accordance with the instant invention.

Referring now to FIG. 4, there is illustrated therein a perspective view of the sealed electrochemical charge storage device described hereinabove with respect to FIG. 3. The stacked arrangement comprises a stack 142 of the individual elements described in FIG. 3 hereof. The sealed electrochemical charge storage device is disposed between the first and second polymer packaging films 112 and 128. The first and second tabs 134 and 136 extend from the package, and the point where they exit the package is sealed by a polymer sealing strip 130 of FIG. 3. As may be appreciated from FIG. 4, the battery cells may be fabricated as flat, elongated portions approximately the appearance of a watch band.

An electrochemical charge storage device cell package has significant weight reduction advantage over similar devices packaged in metal cans. Further, a device so packaged can be conformed to given form factor, for example, the wrist of a user. Further, because the packaging is relatively rough and durable, it will provide long life as both the electrochemical charge storage device for use with the device 10, as well as the wristband for such a device.

Figure 5:
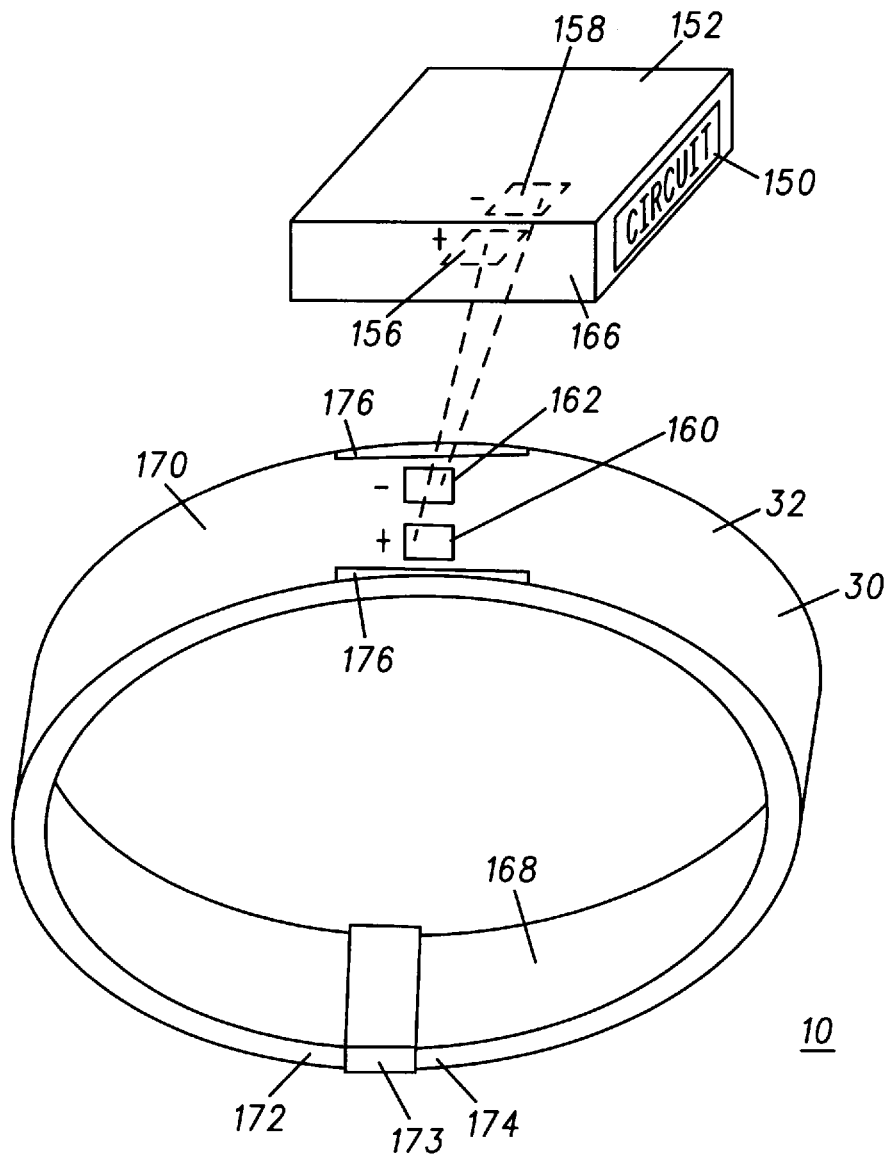
FIG. 5 is a perspective view of a second alternative embodiment of the table electronic device in accordance with the present invention.
Figure 6:
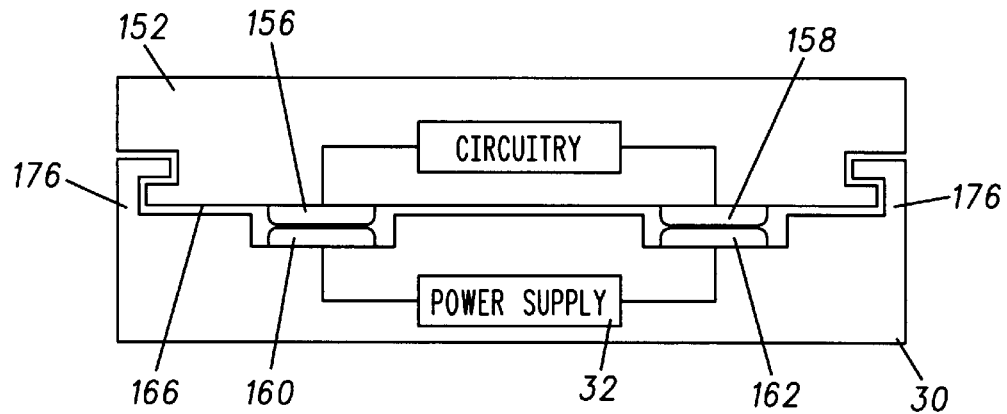
FIG. 6 is a cross-section view of the portable electronic device shown in FIG. 5.

FIG. 5 is a perspective view of a second alternative embodiment of the portable electronic device 10 in accordance with the present invention. FIG. 6 is a cross-section view of the portable electronic device shown in FIG. 5. The portable electronic device 10 comprises an electronic circuit 150, a housing 152, a an energy storage device 32 and a wrist band 30. The housing 152 contains the electronic circuit 150 and has first 156 and second 158 contacts electrically coupled to the electronic circuit 150. The first 156 and second 158 contacts carry positive and negative electrical charges, respectively. The wrist band 30 contains the energy storage device 32. The wrist band has first 160 and second 162 terminals electrically coupled to the energy storage device 32. The first 160 and second 162 contacts carry positive and negative electrical charges, respectively. The first 160 and second 162 terminals are also electrically coupled to the first 156 and second 158 contacts of the housing 152, respectively.

The electronic circuit 150 preferably comprises radiotelephone circuitry. Alternatively, the electronic circuit 150 may comprise for example a pager circuitry, a battery charging circuitry, an integral wristwatch/pager, an integral wristwatch/portable telephone or an integral pager/portable telephone.

According to one aspect of the present invention, the first 156 and second 158 contacts of the housing 152 and the first 160 and second 162 terminals of the wrist band 30 are positioned to be substantially protected from contamination by the external environment and from contact with the user's wrist when the housing 152 is carried on the wrist band 30 and the wrist band 30 is worn on the user 's wrist. In the preferred embodiment, the wrist band 30 has a first side 168 disposed essentially opposite a second side 170. The first side 168 is in contact with the user's wrist when the wrist band 30 is worn on the user's wrist. The first 160 and second 162 terminals are carried on the second side 170 of the wrist band 30 and are substantially isolated and insulated from the first side 168 of the wrist band 30. Preferably, the first 160 and second 162 terminals are disposed in recessed in the second side 170 of the wrist band 30. Recessed terminals protect the terminals from shorting out when the housing 152 is not attached to the wrist band. Further, in the preferred embodiment, the first 156 and second 158 contacts are disposed on a side 166 of the housing 152. The first 156 and second 158 contacts and the first 160 and second 162 terminals are disposed between the side 166 of the housing 152 and the second side of the wrist band. Therefore, the electrical connections are located under the housing 152 and covered or protected by the housing 152. This electrical connection arrangement advantageously improves the reliability of the connection over time by shielding them from environmental contamination such as rain, dirt and dust. By shielding the connection from the user's wrist, the electrical connection arrangement is also protected from being contaminated by human sweat which could short out the battery contacts. In a wrist carried device this aspect of the present invention is critical to provide reliable electrical connections.

According to another aspect of the present invention, there are only two electrical connections (positive and negative) between the energy storage device 32 and the housing. Such an arrangement simplifies the design, improves alignment between corresponding contacts and reduces parts count by eliminating additional contacts. In a wrist carried device this aspect of the present invention is critical to provide electrical connections using minimum space.

The energy storage device 32 is preferably a compliant energy storage device forming the wrist band 30 as described hereinabove. In the preferred embodiment, the compliant energy storage device forming the wrist band is a substantially flat, elongated, flexible battery cell. Particularly, the substantially flat, elongated, flexible battery cell is a lithium polymer battery.

According to still another aspect of the present invention, the wrist band 30 is a single, continuous wrist band having the energy storage device 32 contained substantially throughout the wrist band 30. The wrist band 30 has a first end 172 disposed essentially opposite a second end 174. The housing 152 is mechanically and electrically coupled to the wrist band 30 between the first end 172 and the second end 174. The two ends are coupled together by a latch 173. By allowing the band to extend under the housing 152, the overall band size is increased by the length of the housing 152. Therefore, the wrist band 30 can accommodate additional energy storage capacity which in turn provides the electrical circuits in the housing 152 with longer operating time. In a watch phone application, for example, this aspect of the present invention is critical to maximize talk time where limited space is available for a power supply. By extending the wrist band 30 with a power supply under the housing 152 the energy capacity of the power supply can be increased about 20 %. This increase corresponds to a 20% increase in talk time for a user of a watch phone. Note that extending the wrist band 30 under the housing 152 to obtain more energy capacity does not significantly increase the height of the housing 152 above the user's wrist because the wrist band 30 is relatively thin. Alternatively, the wrist band 30 may have a recess designed therein which is large enough to accommodate the housing 152 so that the band appears to be flush with the housing on all sides thereof. Within the recess the individual terminals on the band can be located on any surface of the recess as so desired.

According to still another aspect of the present invention, a latch mechanism 176 releasably secures the housing 152 to the wrist band 30 while the wrist band 30 is worn on the user's wrist. Preferably, the latch mechanism 176 releasably secures the housing 152 to the wrist band 30 between the first end 172 and the second end 174 of the wrist band 30 and permits the positive 156 and negative 158 charge carrying contacts of the housing 152 to align with and abut the positive 162 and negative 164 charge carrying terminals of the wrist band 30 while the wrist band 30 is worn on the user's wrist. For a wrist carried device this aspect of the present invention is advantageously provides the user with a high degree of flexibility in using the device. For example, multiple electronic devices having separate housings may be interchangeably attached to the same wrist band 30. In this case the contacts on each different housing would align with the terminals on the wrist band and the latch mechanism on each different housing would be releasably secured to the mating latch mechanism on the wrist band. The multiple electronic devices which may be interchanged are disclosed hereinabove with reference to alternatives contemplated for the electrical circuit 150.

Figure 7:
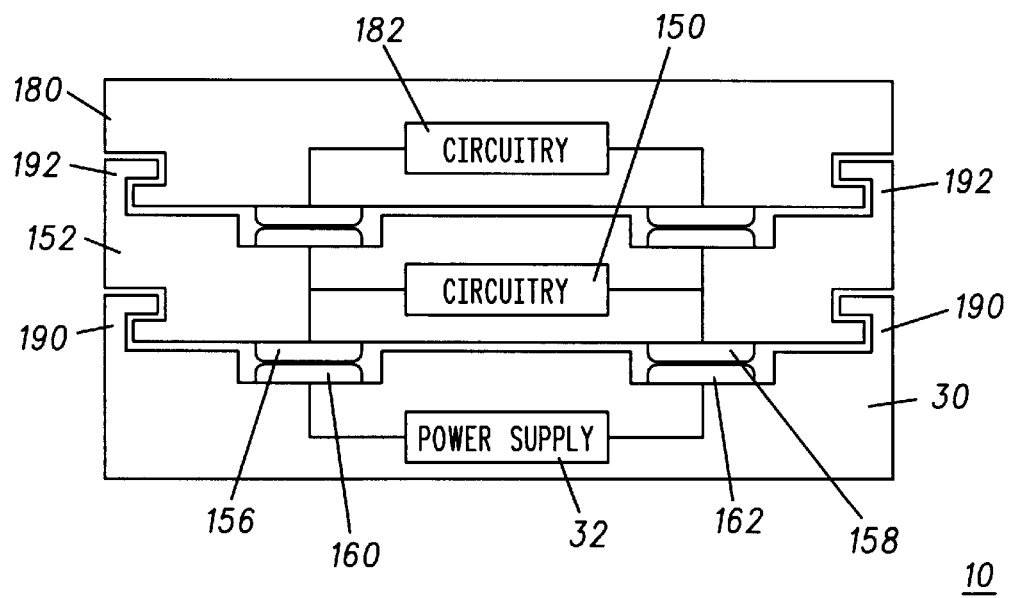
FIG. 7 is a cross-section view of the portable electronic device having stackable housings.

According to still another aspect of the present invention, the multiple electronic devices having separate housings may be stackable on the wrist band and on each other. Such a stack housing arrangement is shown in FIG. 7. For a wrist carried device this aspect of the present invention is advantageously provides a user with the flexibility to add any combination of functions which the user may desire. In a preferred stackable configuration, each housing has two latch mechanisms and two sets of contacts. For example a first latch mechanism 190 would releasably secure a second housing 180 including a second electrical circuit 182 to the wrist band 30 between the first end and the second end of the wrist band 30 and permitting a first pair of positive and negative contacts of the second housing to align with and abut the pair of positive and negative terminals of the wrist band 30 while the wrist band is worn on the user's wrist. A second latch mechanism 192 would releasably secure the first housing 152 to the second housing 180 and permit the pair of positive and negative contacts of the first housing 152 to align with and abut the second pair of positive and negative terminals of the second housing 180. The stackable arrangement can include any number of electrical circuits described hereinabove. For example, a battery charger can be disposed between the band and a radiotelephone to permit the user to charge the battery while making a phone call. As another example, a pager can be disposed between the band and a radiotelephone to permit the user to take advantage of features available to pager/radiotelephone units.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A portable electronic device adapted to be worn on a user's wrist, the portable electronic device comprising:

a first electronic circuit;

a first housing containing the first electronic circuit and having a pair of positive and negative contacts which are electrically coupled to the first electronic circuit;

a second electronic circuit;

a second housing containing the second electronic circuit and having a first pair of positive and negative contacts and a second pair of positive and negative contacts, the first pair of positive and negative contacts being electrically coupled to the second pair of positive and negative contacts, respectively, and to the second electronic circuit;

a compliant energy storage device formed of a substantially flat, elongated, flexible battery cell;

a single, continuous wrist band containing the compliant energy storage device substantially throughout the wrist band, the wrist band having a pair of positive and negative terminals being electrically coupled to the compliant energy storage device, the wrist band having a first end disposed essentially opposite a second end;

a first latch mechanism for releasably securing the second housing to the wrist band between the first end and the second end of the wrist band and permitting the first pair of positive and negative contacts of the second housing to align with and abut the pair of positive and negative terminals of the wrist band while the wrist band is worn on the user's wrist; and a second latch mechanism for releasably securing the first housing to the second housing and permitting the pair of positive and negative contacts of the first housing to align with and abut the second pair of positive and negative terminals of the second housing.

2. A portable electronic device according to claim 1 wherein the first and second contacts of the first housing and the first and second terminals of the wrist band are positioned to be substantially protected from contamination by the external environment and from contact with the user's wrist when the first housing is carried on the wrist band and the wrist band is worn on the user's wrist.

3. A portable electronic device according to claim 2 wherein the wrist band has a first side disposed essentially opposite a second side, the first side being in contact with the user's wrist when the wrist band is worn on the user's wrist, the first and second terminals being carried on the second side of the wrist band and being substantially isolated from the first side of the wrist band.

4. A portable electronic device according to claim 3 wherein the first and second contacts are disposed on a side of the first housing, and wherein the first and second contacts and the first and second terminals are disposed between the side of the first housing and the second side of the wrist band.

* * * * *